United States Patent
Crawford et al.

(10) Patent No.: US 9,886,333 B2
(45) Date of Patent: Feb. 6, 2018

(54) COMMAND-BASED STORAGE SCENARIO PREDICTION

(71) Applicant: International Business Machines Corporation, Armonk, NY (US)

(72) Inventors: Joshua J. Crawford, Tucson, AZ (US); Paul A. Jennas, II, Tucson, AZ (US); Jason L. Peipelman, Vail, AZ (US); Matthew J. Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 14/712,685

(22) Filed: May 14, 2015

(65) Prior Publication Data
US 2016/0335141 A1    Nov. 17, 2016

(51) Int. Cl.
| G06F 9/54 | (2006.01) |
| G06F 11/34 | (2006.01) |
| G06F 11/30 | (2006.01) |
| G06F 9/44 | (2006.01) |

(52) U.S. Cl.
CPC .......... *G06F 9/542* (2013.01); *G06F 11/3024* (2013.01); *G06F 11/3409* (2013.01); *G06F 9/4443* (2013.01)

(58) Field of Classification Search
None
See application file for complete search history.

(56) References Cited

U.S. PATENT DOCUMENTS

| 6,834,299 | B1 * | 12/2004 | Hamilton, II | ........... H04L 29/06 370/411 |
| 8,612,439 | B2 | 12/2013 | Prahlad et al. | |
| 2006/0015682 | A1 * | 1/2006 | Hiratsuka | ............. G06F 3/0613 711/113 |
| 2007/0156265 | A1 * | 7/2007 | McCoy | .............. G05B 19/0426 700/83 |
| 2011/0249862 | A1 * | 10/2011 | Tokikura | ................... G06T 7/20 382/103 |
| 2012/0047403 | A1 * | 2/2012 | Saito | ................... G06F 11/0724 714/47.2 |
| 2012/0110259 | A1 | 5/2012 | Mills et al. | |

(Continued)

OTHER PUBLICATIONS

Alur, Nagraj, et al., "LinkIntegrity+: A Web Asset Integrity Solution," Proceeding of the 2nd International Conference on Internet Computing (IC 2001), Jun. 2001, 5 pages.

*Primary Examiner* — Tuan Dao
(74) *Attorney, Agent, or Firm* — Kunzler PC (57) ABSTRACT

An apparatus, method, system, and program product are disclosed for command-based storage scenario prediction. A registration module registers a listener to receive notifications associated with a scenario, which comprises a predefined sequence of a plurality of commands. A command module determines an initial scenario sequence comprising a subset of the plurality of commands of the scenario. A monitor module detects execution of commands on a device. A notification module sends a notification to the listener in response to detecting execution of a sequence of commands comprising the initial scenario sequence. The notification includes a hint indicating to the listener to prepare for one or more remaining commands of the scenario.

13 Claims, 5 Drawing Sheets

(56) References Cited

U.S. PATENT DOCUMENTS

2012/0124244 A1\* 5/2012 Yew .................. G06F 9/4443
 710/7
2014/0201672 A1\* 7/2014 Borzello ............. G06F 3/0482
 715/779

\* cited by examiner

COMMAND-BASED STORAGE SCENARIO PREDICTION

FIELD

The subject matter disclosed herein relates to data storage and more particularly relates to monitoring storage commands to predict storage scenarios.

BACKGROUND

Some storage technologies manipulate or migrate data based on data plane information, such as I/O heat maps, application hints, user input, etc. These methods, however, may not be able to predict a change in workload, a control plane event, or may be too tedious or cumbersome manage. Moreover, the methods above may not monitor and recognize storage commands, e.g., commands issued in the control plane, that may provide an indication, hint, suggestion, etc., for storage-related activities.

SUMMARY

An apparatus for command-based storage scenario prediction is disclosed. A method and program product also perform the functions of the apparatus. In one embodiment, an apparatus includes a registration module configured to register a listener to receive notifications associated with a scenario. In one embodiment, the scenario includes a predefined sequence of a plurality of commands. The apparatus, in a further embodiment, includes a command module configured to determine an initial scenario sequence comprising a subset of the plurality of commands of the scenario. In another embodiment, the apparatus includes a monitor module configured to detect execution of commands on a device. In various embodiments, the apparatus includes a notification module configured to send a notification to the listener in response to detecting execution of a sequence of commands comprising the initial scenario sequence. In one embodiment, the notification includes a hint indicating to the listener to prepare for one or more remaining commands of the scenario.

A method, in one embodiment, includes registering a listener to receive notifications associated with a scenario. In one embodiment, the scenario includes a predefined sequence of a plurality of commands. The method may also include determining an initial scenario sequence comprising a subset of the plurality of commands of the scenario. In a further embodiment, the method includes detecting execution of commands on a device. The method may include sending a notification to the listener in response to detecting execution of a sequence of commands comprising the initial scenario sequence. In one embodiment, the notification includes a hint indicating to the listener to prepare for one or more remaining commands of the scenario.

In one embodiment, a computer program product includes a computer readable storage medium having program instructions embodied therewith. The program instructions, in some embodiments, are readable/executable by a processor to cause the processor to register, by processor, a listener to receive notifications associated with a scenario. In one embodiment, the scenario includes a predefined sequence of a plurality of commands. The program instructions, in one embodiment, are readable/executable by a processor to cause the processor to determine, by processor, an initial scenario sequence comprising a subset of the plurality of commands of the scenario. In a further embodiment, the program instructions are readable/executable by a processor to cause the processor to detect, by processor, execution of commands on a device. In various embodiments, the program instructions are readable/executable by a processor to cause the processor to send, by processor, a notification to the listener in response to detecting execution of a sequence of commands comprising the initial scenario sequence. In one embodiment, the notification includes a hint indicating to the listener to prepare for one or more remaining commands of the scenario.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

Figure 1:
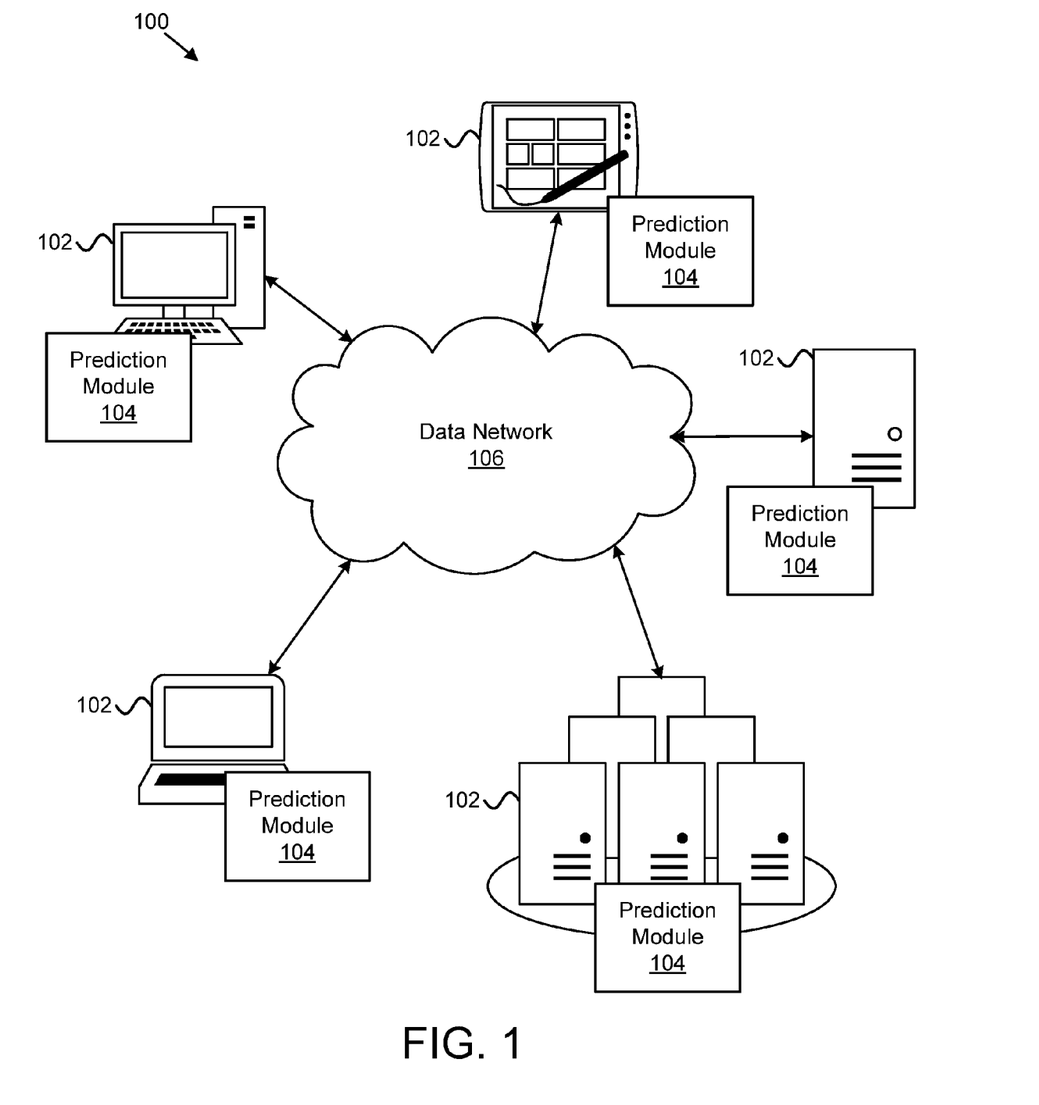
FIG. 1 is a schematic block diagram illustrating one embodiment of a system for command-based storage scenario prediction in accordance with one embodiment of the present invention.

FIG. 1 depicts one embodiment of a system 100 for command-based storage scenario prediction. In one embodiment, the system 100 includes information handling devices 102, prediction modules 104, and networks 106. Even though a particular number of information handling devices 102, prediction modules 104, and networks 106 are depicted in the system 100 of FIG. 1, one of skill in the art will recognize that any number or configuration of information handling devices 102, prediction modules 104, and networks 106 may be present in the system 100.

The information handling devices 102, in certain embodiments, includes computing devices, such as desktop computers, laptop computers, tablet computers, smart phones, smart televisions, or the like. The information handling devices 102 may also include servers, such as web servers, application servers, file servers, media servers, email servers, cloud servers, backup servers, virtual servers, or the like. In some embodiments, the information handling devices 102 may be part of a data center used for data storage, data backup, data replication, disaster recovery, and/or the like. The information handling devices 102 may be located in geographically remote locations, in the same geographic location (e.g., the same data center), or some combination of both.

The information handling devices 102 may be configured to store data, backup data, replicate data, or the like. For example, the information handling devices 102 may be configured to perform synchronous or asynchronous data replication. In another example, information handling devices 102 may be configured as failover devices for one or more associated with production information handling devices 102. Moreover, the information handling devices 102 may comprise one or more storage resources, such as physical and/or logical storage volumes, storage devices, RAID devices or configurations, or the like, such as hard-disk drives, solid-state drives, flash memory devices, random-access memory (RAM), SATA devices, tape devices, or the like. In some embodiments, the information handling devices 102 are in communication via one or more data networks 106, described below.

In one embodiment, the prediction module 104 is configured to register a listener, such as a device 102, an application running on a device 102, or the like, to receive notifications associated with a scenario. As used herein, a scenario comprises a predefined sequence of a plurality of commands that are executed on one or more information handling devices 102, such as a plurality of commands comprising a data optimization scenario, a data replication scenario, a disaster recovery scenario, or the like.

The prediction module 104 is further configured to determine an initial scenario sequence comprising a subset of the plurality of commands of the scenario and detect execution of commands executing on one or more information handling devices 102. The prediction module 104 may also be configured to send a notification to the registered listener in response to detecting execution of the commands of the initial scenario sequence. The notification may include a hint that indicates to the listener to prepare for one or more remaining commands of the scenario. In this manner, the prediction module 104 may predict future commands for a scenario, based on previously executed commands, in order to allow listeners to anticipate and prepare for the remaining commands of the scenario, without solely relying on data plane information, such as I/O heat maps, application hints, or user input. Ultimately, this may allow data migration, data backup, disaster recovery, or the like situations to occur faster and more efficiently. In certain embodiments, as described below with reference to FIGS. 2 and 3, the prediction module 104 includes a plurality of modules that perform the operations of the prediction module 104.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, random access memory (RAM), or the like.

Figure 2:
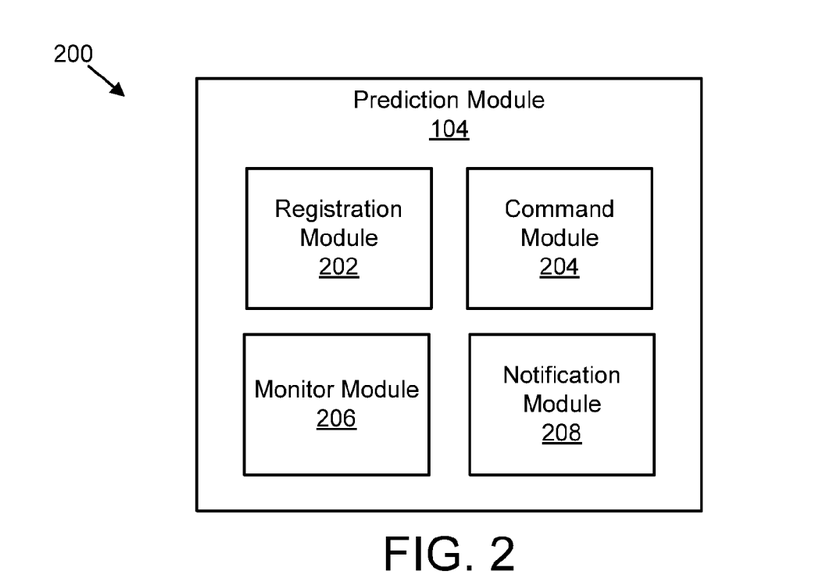
FIG. 2 is a schematic block diagram illustrating one embodiment of a module for command-based storage scenario prediction in accordance with one embodiment of the present invention.

FIG. 2 is a schematic block diagram illustrating one embodiment of a module 200 for command-based storage scenario prediction. In one embodiment, the module 200 includes an embodiment of a prediction module 104. The prediction module 104, in various embodiments, includes one or more of a registration module 202, a command module 204, a monitor module 206, and a notification module 208, which are described in more detail below.

In one embodiment, the registration module 202 is configured to register a listener to receive notifications associated with a scenario. As described above, a listener may include a device 102, an application executing on a device 102, or the like. For example, a data recovery application may be register as a listener for a failover scenario. In some embodiments, the listener may comprise an Easy Tier® application developed by IBM® of Armonk, N.Y. IBM Easy Tier® is a storage application designed to automate data placement throughout a disk pool to improve the efficiency and performance of a storage system by relocating data (at the extent level) across drive tiers automatically and without disrupting applications.

As used herein, a scenario may comprise a plurality of commands that are performed in a particular order for a particular purpose. In some embodiments, the scenario may be associated with data replication, data optimization, disaster recovery, backup, or the like. For example, a disaster recovery scenario may comprise the following commands completed in this particular order:

1. Pause global minor (GMIR) master
2. Suspend GCP pairs
3. Failover at GCP secondary
4. Fast Reverse Restore from server/volume/tier C to server/volume/tier B
5. Query until Fast Reverse Restore completes
6. Create a flash (point-in-time) copy of server/volume/tier B and send to server/volume/tier D
7. Create a flash copy of server/volume/tier B and send to server/volume/tier C
8. Failback server/volume/tier A to server/volume/tier B
9. Resume GMIR master A scenario may comprise any number of commands and a listener may register for any number of scenarios. The registration module 202 may provide an application program interface (API) for listeners to use to register to receive notifications for a particular scenario. In some embodiments, the registration module 202 registers a listener for a plurality of scenarios, a plurality of different notifications for a scenario, and/or the like.

The command module 204, in one embodiment, is configured to determine an initial scenario sequence of a scenario. As used herein, an initial scenario sequence comprises a subset of commands of the plurality of commands of the scenario. For example, using the scenario above, the initial scenario sequence may comprise commands associated with steps 1-3. In some embodiments, the command module 204 determines the initial scenario sequence in response to the listener specifying which commands of the scenario comprise the initial scenario sequence. For example, the command module 204 may provide an API that listeners can use to specify which of the commands of the scenario comprise the initial scenario sequence.

The monitor module 206, in one embodiment, is configured to detect execution of commands on a device 102 (e.g., commands issued and/or executed in the control plane). In certain embodiments, the monitor module 206 detects execution of commands as they are issued by a host device 102. For example, the monitor module 206 may detect the execution of a command by an application, a program, or the like that is running on a host device 102. In a further embodiment, the monitor module 206 detects executing commands that are issued by a user. For example, the monitor module 206 may detect an executed command issued by a user via a command line interface, a graphical user interface, or the like.

In some embodiments, the monitor module 206 may receive a signal, flag, or other indication in response to a command being executed. In one embodiment, the monitor module 206 may poll or check at periodic intervals for commands that have been executed. For example, the monitor module 206 may check a table, registry, log file, or the like of executed commands periodically, such as every second, minute, or the like. The monitor module 206, in various embodiments, may detect commands that have been executed on a plurality of devices 102 of a networked computing environment. In such an embodiment, the monitor module 206 may located on a single (e.g., central) device 102 and receive notifications from a one or more different devices 102, which may be geographically dispersed, comprising commands that have been executed on the different devices 102.

In some embodiments, the monitor module 206 is configured to only detect commands of a particular type, for a particular application, associated with particular devices 102 or storage resources, or the like, and ignores certain commands, such as query commands, such that they do not interrupt the sequence of commands of the scenario. For example, the monitor module 206 may be configured to only detect commands that are sent from server A to server B, are associated with a data replication process or application, and are not data query commands.

In one embodiment, the notification module 208 is configured to send a notification to a registered listener in response to the monitor module 206 detecting execution of a sequence of commands comprising the initial sequence of commands. In certain embodiments, the notification comprises a hint indicating to the listener to prepare for one or more remaining commands of the scenario. For instance, given the sequence of commands above for the disaster recovery scenario, the notification module 208 may send a hint after the command for step 3 has been executed, which may be the last command of the initial scenario sequence, to indicate to the listener that a disaster recovery process is being performed so that the listener can prepare or anticipate the remaining commands of the disaster recovery process. The hint may indicate that the listener migrate specific data from one volume or storage device to another volume or storage device (e.g., from a slower hard-disk drive to a faster solid-state drive), or the like. In certain embodiments, the notification module 208 sends an electronic message or signal to the listener, sets a flag that the listener checks, or the like, to inform the listener that the initial scenario sequence has been detected.

Figure 3:
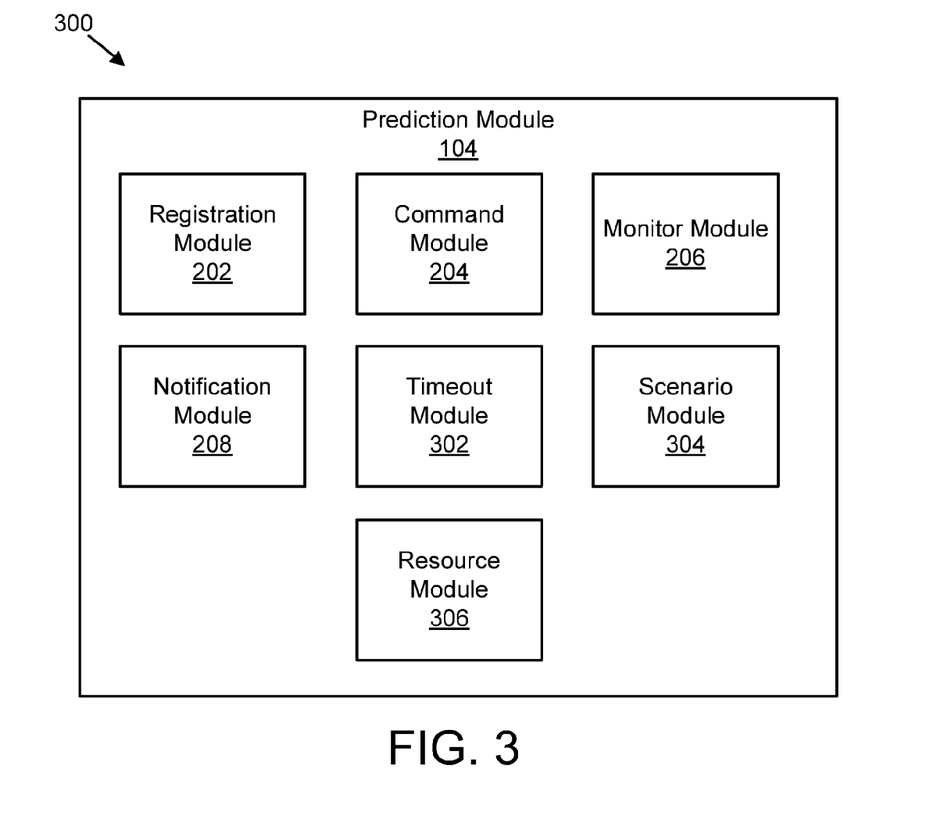
FIG. 3 is a schematic block diagram illustrating one embodiment of another module for command-based storage scenario prediction in accordance with one embodiment of the present invention.

FIG. 3 is a schematic block diagram illustrating one embodiment of another module 300 for command-based storage scenario prediction. In one embodiment, the module 300 includes an embodiment of a prediction module 104. The prediction module 104, in various embodiments, includes one or more of a registration module 202, a command module 204, a monitor module 206, and a notification module 208, which may be substantially similar to the registration module 202, the command module 204, the monitor module 206, and the notification module 208 described above. The prediction module 104 may also include one or more of a timeout module 302, a scenario module 304, and a resource module 306, which are described in more detail below.

In one embodiment, the timeout module 302 is configured to begin a timeout period in response to the monitor module 206 detecting execution of the first command of the initial scenario sequence. As used herein, the timeout period comprises an amount of time to detect commands of the scenario. Thus, for example, after the monitor module 206 detects the first command of the initial scenario sequence, the timeout module 302 may set a timeout period of one hour to detect the remaining commands of the scenario. In certain embodiments, the timeout period is on the order of seconds, minutes, hours, or the like. In some embodiments, a listener can specify, via an API, or the like, the timeout period.

In some embodiments, the notification module 208 is further configured to send a notification to the registered listener indicating completion of the scenario in response to the monitor module 206 detecting execution of the remaining commands of the scenario within the timeout period. In certain embodiments, the notification module 208 is further configured to send to the registered listener a timeout notification in response to not detecting execution of a command of the plurality of commands of the scenario within the timeout period. For example, if a scenario requires executing commands A, B, and C, but the monitor module 206 only detects commands A and B within the timeout period, the notification module 208 may send a timeout notification to the listener.

In a further embodiment, the notification module 208 is configured to send an interrupt notification to the listener in response to the monitor module 206 detecting execution of a command that is not a command of the scenario within the timeout period. For example, if the scenario requires executing commands A, B, and C, but the monitor module 206 detects execution of command D after command B is executed, the notification module 208 may send an interrupt notification to the listener indicating the that sequence of commands of the scenario was interrupted (indicating that the anticipated or predicted scenario was not being performed.

The listener, in some embodiments, in response to receiving a scenario completion notification, a timeout notification, or an interrupt notification, may reset any preparations, steps, suggestions, or the like that may have been implemented in anticipation of the predicted scenario.

The scenario module 304, in certain embodiments, is configured to maintain a database, data store, file, or the like of a plurality of different preconfigured scenarios. For example, a scenario database may include scenarios for different data replication processes, disaster recovery processes, data restore processes, and/or the like. The preconfigured scenarios may include sequences of commands for well-known, commonly used, or repetitive processes. For example, the scenario module 304 may maintain a data replication scenario that is performed on a daily basis in the database.

In some embodiments, the scenario module 304 is further configured to register a custom scenario in the database in response to receiving a predefined sequence of commands comprising the scenario. For example, if server A has specialized hardware or software, it may require a different set of commands to be performed in a different sequence than any of the preconfigured scenarios stored in the database. In response to receiving the custom scenario, the scenario module 304 may add the scenario to the database, including the order of the commands that comprise the scenario, in order for it to be referenced in the future. A listener, instead of providing a scenario, e.g., a predefined order of commands, to the registration module 202 may instead select or reference a preconfigured or custom scenario from the database. In one embodiment, the scenario module 304 provides an API that a listener can use to specify which scenario to register for and/or to provide the commands comprising a custom scenario to register in the database.

In one embodiment, the resource module 306 is configured to determine a plurality of storage resources associated with the scenario. As used herein, a storage resource may comprise a logical or physical storage volume. For example, the resource module 306 may determine that logical storage volume A on server A, physical storage volume B on server B, and logical storage volume C on server C are the only storage volumes associated with the given scenario. Therefore, the monitor module 206 may only monitor commands that are executed and affect storage volumes A, B, and C, and not commands that are associated with different storage volumes instead of storage volumes A, B, and C. In one embodiment, the resource module 306 provides an API that a listener can use to specify which storage resources to monitor for a scenario.

As shown in the previous example, the resource module 306 may monitor commands associated with storage volumes or storage devices that are located on different information handling devices 102 as part of a networked computing environment. Thus, the monitor module 206 may detect execution of the sequence of commands of the scenario across a plurality of devices 102. For example, if a scenario requires executing commands A, B, and C, the monitor module 206 may detect command A executing on server A, command B executing on server B, and command C executing on server C, provided that the commands are executed in the predefined sequence determined by the scenario.

Figure 4A:
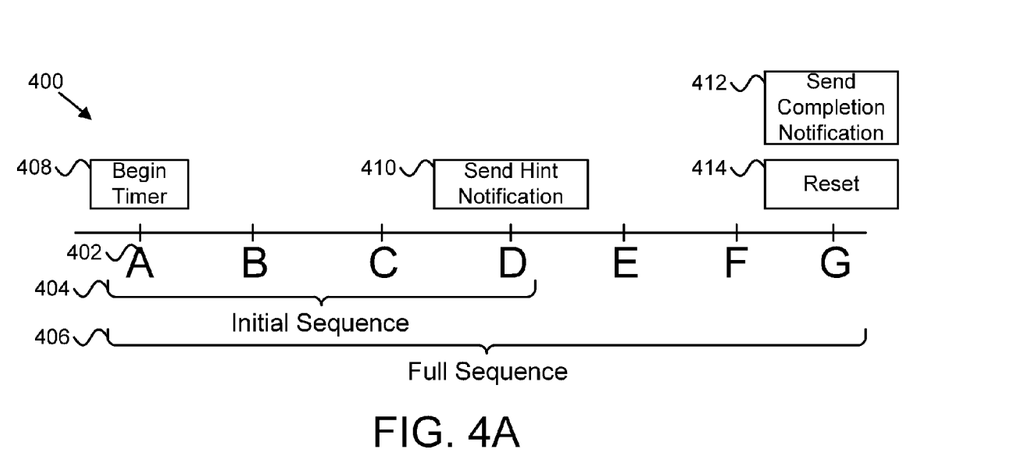
FIG. 4A illustrates one embodiment of a scenario for command-based storage scenario prediction in accordance with one embodiment of the present invention.

FIG. 4A illustrates one embodiment 400 of a scenario for command-based storage scenario prediction. In one embodiment, a scenario comprises a sequence 406 of a plurality of commands 402, in this instance commands A-G. In some embodiments, the command module 204 determines an initial scenario sequence 404 comprising a subset of the plurality of commands 402, in this instance commands A, B, C, and D comprise the initial scenario sequence.

In one embodiment, the monitor module 206 detects execution of the first command 402 'A' of the initial scenario sequence 404. In response to detecting the first command 402 'A' of the initial scenario sequence 404, the timeout module 302 may begin a timer 408, which sets the time period for detecting the full scenario sequence 406. In response to the monitor module 206 detecting the last command 402 'D' of the sequence of commands 402 comprising the initial scenario sequence 404, the notification module 208 may send a notification 410 to listeners registered to receive notifications for this scenario. The notification 410 may comprise a hint to the listeners that the initial scenario sequence 404 for this scenario has been detected and that it is likely that the remaining commands 402 of the scenario will be executed. In this manner, listeners can prepare for the remaining commands 402 of the scenario by migrating data between volumes or storage devices, setting different application or data priorities, or the like, for example.

In one embodiment, if the monitor module 206 detects execution of the last command 402 'G' of the full scenario sequence 406, within the timeout period, the notification module 208 may send a completion notification 412 to indicate to listeners that the full scenario sequence 406 is complete. The listeners, in response to receiving the completion notification 412, may reset 414 any settings, preparations, or the like that a listener implemented in preparation for completion of the scenario.

Figure 4B:
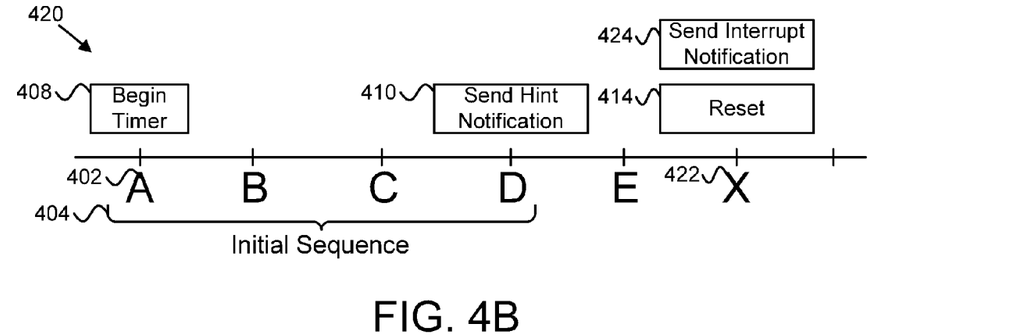
FIG. 4B illustrates one embodiment of another scenario for command-based storage scenario prediction in accordance with one embodiment of the present invention.

FIG. 4B illustrates one embodiment 420 of another scenario for command-based storage scenario prediction. As described above with reference to FIG. 4A, the timeout module 302 begins a timer 408 in response to the monitor module 206 detecting the first command 402 'A' of the initial scenario sequence 404. The notification module 208, in one embodiment, sends a notification hint 410 in response to the monitor module 206 detecting the last command 402 'D' of the initial scenario sequence 404.

In one embodiment, however, the monitor module 206 may detect a command 422 'X' that is not a command 402 in the sequence of commands comprising the scenario. Thus, detection of the command 422 'X' interrupts the sequence of commands 402 comprising the scenario, which may indicate that the scenario (e.g., a data replication scenario) is not actually being performed. In such an embodiment, the notification module 208 sends an interrupt notification 424 to any listeners registered for this scenario, and the listeners may reset 414 their settings to prepare for a new scenario.

Figure 4C:
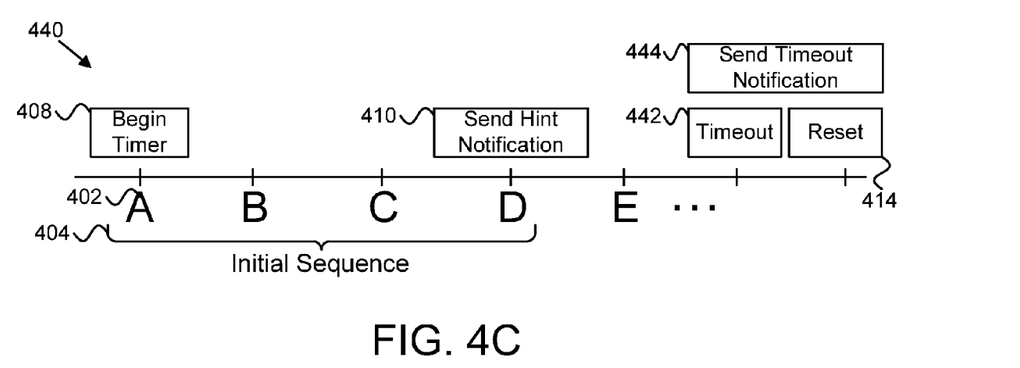
FIG. 4C illustrates one embodiment of yet another scenario for command-based storage scenario prediction in accordance with one embodiment of the present invention.

FIG. 4C illustrates one embodiment 440 of yet another scenario for command-based storage scenario prediction. As described above with reference to FIGS. 4A and 4B, the timeout module 302 begins a timer 408 in response to the monitor module 206 detecting the first command 402 'A' of the initial scenario sequence 404. The notification module 208, in one embodiment, sends a notification hint 410 in response to the monitor module 206 detecting the last command 402 'D' of the initial scenario sequence 404.

FIG. 4C, however, depicts one embodiment of not receiving the full sequence of commands 402 of the scenario within the timeout period. As shown in FIG. 4C, the monitor module 206 does not receive the remaining commands 402 of the scenario, e.g., commands 402 'F' and 'G', after detection of command 402 'E', before the timeout period expires. In response to the timeout period expiring 442, the notification module 208 may send a timeout notification 444, and any registered listeners may reset 414 their settings in preparation for a new scenario.

Figure 5:
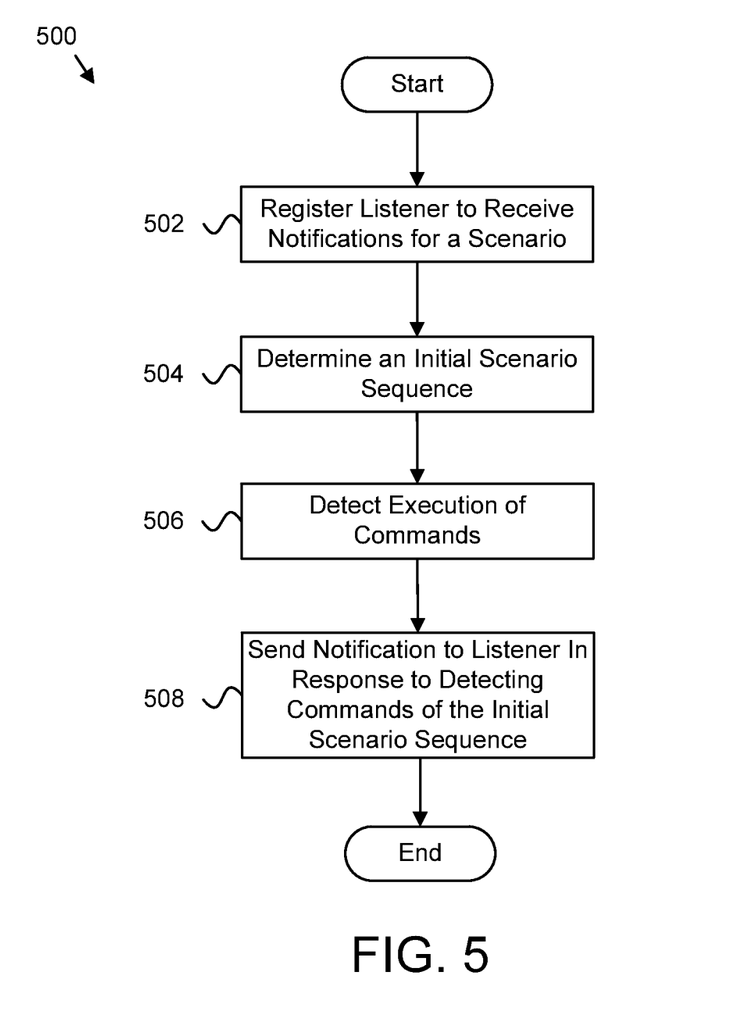
FIG. 5 is a schematic flow chart diagram illustrating one embodiment of a method for command-based storage scenario prediction in accordance with one embodiment of the present invention.

FIG. 5 is a schematic flow chart diagram illustrating one embodiment of a method 500 for command-based storage scenario prediction. In one embodiment, the method 500 begins and the registration module 202 registers 502 a listener to receive notifications associated with a scenario. The command module 204, in certain embodiments, determines 504 an initial scenario sequence comprising a subset of the plurality of commands of the scenario. In some embodiments, the monitor module 206 detects 506 execution of commands on a device. The notification module 208, in one embodiment, sends 508 a notification to the listener in response to detecting execution of a sequence of commands comprising the initial scenario sequence, and the method 500 ends.

Figure 6:
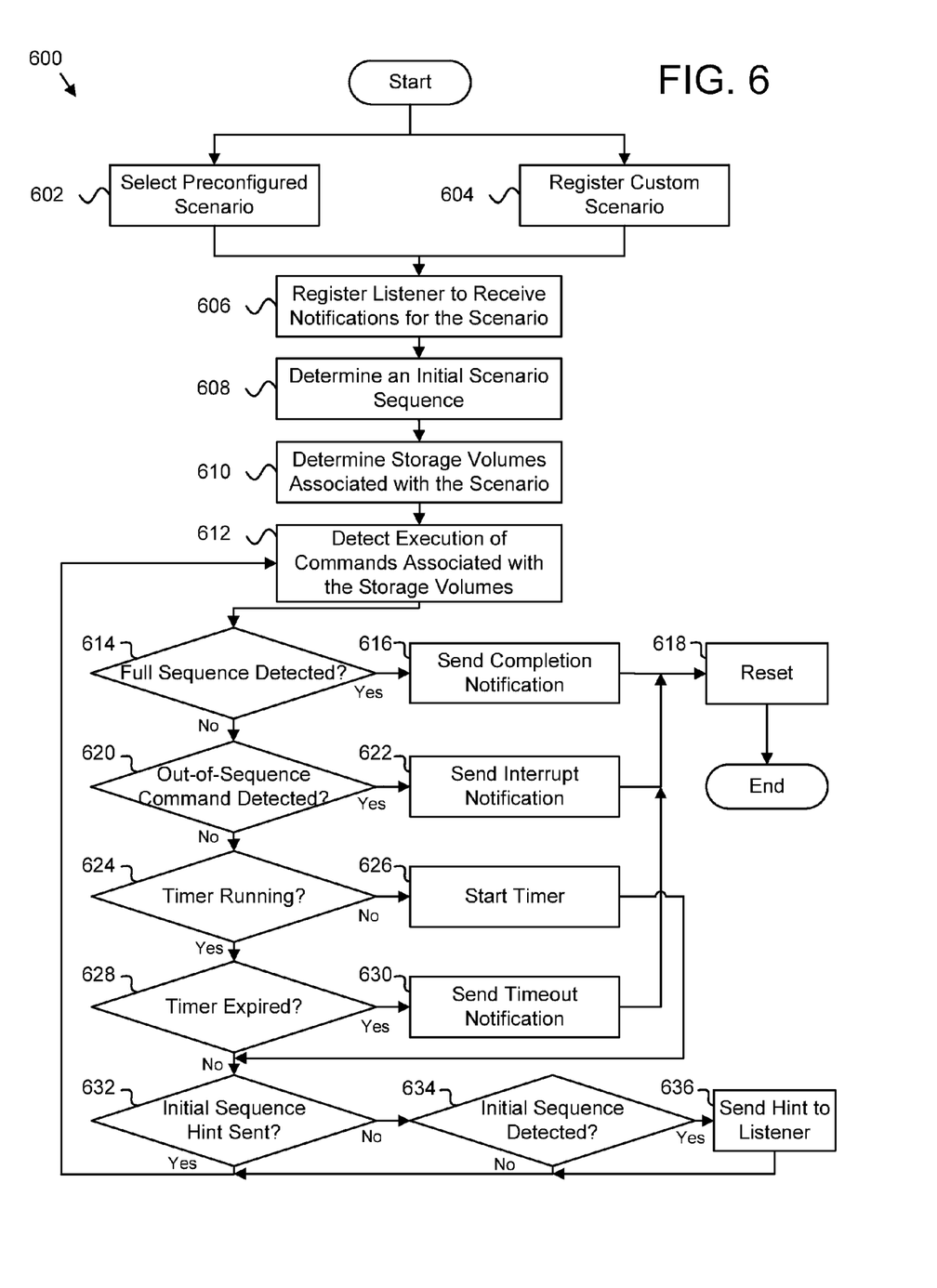
FIG. 6 is a schematic flow chart diagram illustrating one embodiment of another method for command-based storage scenario prediction in accordance with one embodiment of the present invention.

FIG. 6 is a schematic flow chart diagram illustrating one embodiment of another method 600 for command-based storage scenario prediction. In one embodiment, the scenario module 302 selects 602 a preconfigured scenario from a database, or the like, in response to the listener specifying a particular preconfigured scenario. In a further embodiment, the scenario module 302 registers 604 a custom scenario in response to receiving a scenario from a listener comprising a sequence of commands. In one embodiment, the registration module 202 registers 606 a listener to receive notifications associated with the scenario. The command module 204, in certain embodiments, determines 608 an initial scenario sequence comprising a subset of the plurality of commands of the scenario.

The resource module 306, in one embodiment, determines 610 which storage resources are associated with the scenario such that the monitor module 206 may detect 612 the execution of commands related to the determined storage resources. The monitor module 206, in a further embodiment, determines 614 whether the full sequence of commands of the scenario has been detected. If so, the notification module 208 sends 616 a completion notification to listeners registered for the scenario, the listeners reset 618 their settings, and the method 600 ends.

If the monitor module 206 determines 614 that the full sequence has not been detected, the monitor module 206 determines 620 whether an out-of-sequence command was detected. If so, the notification module 208 sends 622 an interrupt notification to registered listeners indicating that the scenario was not completed, the listeners reset 618 their settings, and the method 600 ends. In a further embodiment, if the monitor module 206 does not detect 620 an out-of-sequence command, the timeout module 302 determines 624 whether the timer is running. If not, the timeout module 302 starts 626 the timer for the timeout period. If the timeout module 302 determines 624 that the timer is running, the timeout module 302 determines 628 whether the timer has expired. If the timer has expired, the notification module 208 sends 630 a timeout notification to the registered listeners indicating that the scenario was not detected within the timeout period. The listeners reset 618 their settings, and the method 600 ends.

If the timeout module 302 determines 628 that the timer has not expired, the notification module 208 determines 632 whether the initial scenario sequence notification has been sent. If so, the monitor module 206 continues to detect 612 execution of commands. If the initial scenario sequence notification has not been sent, the monitor module 206 determines 634 whether all the commands of the initial scenario sequence have been detected. If not, the monitor module 206 continues to detect 612 execution of commands. If the monitor module 206 determines 634 that the full initial scenario sequence has been detected, the notification module 208 sends 636 the initial scenario sequence notification to the registered listeners to provide a hint that a particular scenario may be in process, and the monitor module 206 continues to detect 612 execution of commands of the scenario.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a registration module configured to register a listener to receive notifications associated with a scenario, the scenario comprising a predefined sequence of a plurality of commands that, when executed, affect a plurality of different storage drives, wherein at least a portion of the plurality of storage drives are located on different computing devices communicatively coupled in a networked computing environment;
   a command module configured to determine an initial scenario sequence of the scenario, the initial scenario sequence comprising a subset of the plurality of commands comprising the scenario;
   a monitor module configured to detect execution of commands associated with the plurality of different storage drives and determine that the detected commands are performed in a sequence that comprises the initial scenario sequence across the plurality of different storage drives;
   a timeout module configured to begin a timeout period in response to detecting execution of a first command of the initial scenario sequence; and
   a notification module configured to:
      send a notification to the listener in response to the monitor module detecting execution of the sequence of commands comprising the initial scenario sequence on the storage drives, the notification comprising an indication for the listener to prepare for one or more remaining commands of the scenario; and
      send a notification indicating completion of the scenario in response to detecting execution of the remaining commands of the scenario within the timeout period;
   wherein at least a portion of the registration module, the command module, the monitor module, the timeout module, and the notification module comprise one or more of hardware and executable code, the executable code stored on one or more computer readable storage media.

2. The apparatus of claim 1, wherein the notification module is further configured to send a timeout notification in response to not detecting execution of a command of the plurality of commands of the scenario within the timeout period.

3. The apparatus of claim 1, wherein the notification module is further configured to send an interrupt notification in response to detecting execution of a command that is not a command of the scenario within the timeout period.

4. The apparatus of claim 1, further comprising a scenario module configured to maintain a database of a plurality of different preconfigured scenarios, the scenario being selected from the plurality of different preconfigured scenarios by the listener.

5. The apparatus of claim 4, wherein the scenario module registers a custom scenario in the database in response to receiving a predefined sequence of commands defining the scenario.

6. The apparatus of claim 1, wherein the monitor module detects execution of commands in response to commands being issued by one or more of a user and a host device.

7. The apparatus of claim 1, wherein the plurality of commands of the scenario are associated with a data replication process.

8. A method comprising:
   registering a listener to receive notifications associated with a scenario, the scenario comprising a predefined sequence of a plurality of commands that, when executed, affect a plurality of different storage drives, wherein at least a portion of the plurality of storage drives are located on different computing devices communicatively coupled in a networked computing environment;
   determining an initial scenario sequence of the scenario, the initial scenario sequence comprising a subset of the plurality of commands comprising the scenario;
   detecting execution of commands associated with the plurality of different storage drives;
   beginning a timeout period in response to detecting execution of a first command of the initial scenario sequence;
   determining that the detected commands are performed in a sequence that comprises the initial scenario sequence across the plurality of different storage drives;
   sending a notification to the listener in response to the monitor module detecting execution of the sequence of commands comprising the initial scenario sequence on the storage drives, the notification comprising an indication for the listener to prepare for one or more remaining commands of the scenario; and
   sending a notification indicating completion of the scenario in response to detecting execution of the remaining commands of the scenario within the timeout period.

9. The method of claim 8, further comprising sending a timeout notification in response to not detecting execution of a command of the plurality of commands of the scenario within the timeout period.

10. The method of claim 8, further comprising sending an interrupt notification in response to detecting execution of a command that is not a command of the scenario within the timeout period.

11. The method of claim 8, further comprising maintaining a database of a plurality of different preconfigured scenarios, the scenario being selected from the plurality of different preconfigured scenarios by the listener.

12. The method of claim 11, further comprising registering a custom scenario in the database in response to receiving a predefined sequence of commands defining the scenario.

13. A computer program product comprising a computer readable storage medium having program instructions embodied therewith, the program instructions readable/executable by a processor to cause the processor to:
   register, by processor, a listener to receive notifications associated with a scenario, the scenario comprising a predefined sequence of a plurality of commands that, when executed, affect a plurality of different storage drives, wherein at least a portion of the plurality of storage drives are located on different computing devices communicatively coupled in a networked computing environment;
   determine, by processor, an initial scenario sequence of the scenario, the initial scenario sequence comprising a subset of the plurality of commands comprising the scenario;
   detect, by processor, execution of commands associated with the plurality of different storage drives;
   begin, by processor, a timeout period in response to detecting execution of a first command of the initial scenario sequence determine, by processor, that the detected commands are performed in a sequence that comprises the initial scenario sequence across the plurality of different storage drives;

send, by processor, a notification to the listener in response to the monitor module detecting execution of the sequence of commands comprising the initial scenario sequence on the storage drives, the notification comprising an indication for the listener to prepare for one or more remaining commands of the scenario; and send, by processor, a notification indicating completion of the scenario in response to detecting execution of the remaining commands of the scenario within the timeout period.

* * * * *